US009375686B2

(12) United States Patent
Boarman et al.

(10) Patent No.: US 9,375,686 B2
(45) Date of Patent: Jun. 28, 2016

(54) APPARATUS, METHOD AND SYSTEMS FOR PROVIDING SELECTABLE LEVEL CARBONATED WATER

(71) Applicant: Whirlpool Corporation, Benton Harbor, MI (US)

(72) Inventors: Patrick J. Boarman, Evansville, IN (US); Mark E. Thomas, Corydon, IN (US)

(73) Assignee: Whirlpool Corporation, Benton Harbor, MI (US)

( * ) Notice: Subject to any disclaimer, the term of this patent is extended or adjusted under 35 U.S.C. 154(b) by 690 days.

(21) Appl. No.: 13/648,311

(22) Filed: Oct. 10, 2012

(65) Prior Publication Data

US 2014/0099405 A1 Apr. 10, 2014

(51) Int. Cl.
*A23L 2/54* (2006.01)
*A23L 2/00* (2006.01)
(Continued)

(52) U.S. Cl.
CPC ......... *B01F 3/04808* (2013.01); *B01F 3/04588* (2013.01); *B01F 3/04815* (2013.01); *B01F 15/00376* (2013.01); *B01F 15/00389* (2013.01);
(Continued)

(58) Field of Classification Search
CPC .................... B01F 15/00376; B01F 15/00389; B01F 2003/049; B01F 3/04588; B01F 3/04808; B01F 3/04815; B67D 1/006; B67D 1/0071; B67D 1/0074; B67D 1/0075; B67D 1/0076
USPC ....... 261/49, 66, 82, DIG. 7; 99/323.2; 222/1, 222/64, 129.3, 144.5; 426/67
See application file for complete search history.

(56) References Cited

U.S. PATENT DOCUMENTS 2,666,494 A * 1/1954 Engel ...................... F23G 7/065 261/117
3,460,713 A * 8/1969 Cornelius ............ B67D 1/0016 222/1

(Continued)

FOREIGN PATENT DOCUMENTS

GB 2236736 A 4/1991
GB 2437262 A 10/2007

(Continued)

OTHER PUBLICATIONS

European Patent Application No. 13173611.8 filed Jun. 25, 2013, Applicant: Whirlpool Corporation; European Search Report, mail date Jan. 28, 2014 re: same.

*Primary Examiner* — Dana Ross
*Assistant Examiner* — Ket D Dang

(57) ABSTRACT

An improved apparatus and system for on-demand carbonated water production includes at least one carbonating unit having a volume with a inlet in communication with sources of carbonating gas and noncarbonated water, and an outlet for discharging carbonated water. An agitator is housed within the volume of the carbonating unit. A controller and variable speed actuator are operably connected to the agitator. The controller can have a rate of operation for the agitator corresponding to a selected level of carbonation for an agitation interval. The agitation intervals can be fixed or varied to discharge carbonated water at different selected levels of carbonation. The controller can vary the rate of operation for the agitator based, at least in part, on user-independent operating parameters. The controller can increase or decrease in the rate of operation and/or the agitation interval of the agitator to discharge a higher or lower level of carbonation, respectively.

11 Claims, 11 Drawing Sheets

(51) Int. Cl.

| | |
|---|---|
| ***B67D 1/00*** | (2006.01) |
| ***C10J 1/00*** | (2006.01) |
| ***B01F 3/04*** | (2006.01) |
| ***B01F 15/00*** | (2006.01) |

(52) U.S. Cl.

CPC .............. *B67D 1/006* (2013.01); *B67D 1/0071* (2013.01); *B67D 1/0074* (2013.01); *B67D 1/0075* (2013.01); *B67D 1/0076* (2013.01); *B01F 2003/049* (2013.01)

(56) References Cited

U.S. PATENT DOCUMENTS

| | | | | | |
|---|---|---|---|---|---|
| 3,503,540 | A * | 3/1970 | Fuerst | B67D 1/0082 137/553 |
| 3,565,405 | A * | 2/1971 | Stewart | B01F 3/04815 222/129.1 |
| 4,313,897 | A * | 2/1982 | Garrard | 261/64.5 |
| 4,518,541 | A * | 5/1985 | Harris | 261/27 |
| 4,629,589 | A * | 12/1986 | Gupta | B01F 3/04531 222/129.1 |
| 4,719,056 | A | 1/1988 | Scott | |
| 4,808,349 | A * | 2/1989 | Rudick | 261/82 |
| 5,139,708 | A * | 8/1992 | Scott | 261/23.1 |
| 5,178,799 | A * | 1/1993 | Brown et al. | 261/39.1 |
| 5,413,742 | A * | 5/1995 | Gatter | 261/140.1 |
| 5,499,741 | A | 3/1996 | Scott | |
| 5,806,550 | A * | 9/1998 | Frank | A23G 9/045 137/7 |
| 5,855,296 | A * | 1/1999 | McCann et al. | 222/61 |
| 5,964,100 | A | 10/1999 | Wisniewski | |
| 7,114,707 | B2 | 10/2006 | Rona et al. | |
| 2006/0112831 | A1* | 6/2006 | Greenwald et al. | 99/275 |
| 2008/0105989 | A1* | 5/2008 | Rona et al. | 261/50.1 |
| 2009/0121364 | A1* | 5/2009 | Scott | 261/38 |
| 2010/0251901 | A1* | 10/2010 | Santoiemmo | 99/323.2 |
| 2011/0121032 | A1* | 5/2011 | Deo | B67D 1/0027 222/145.1 |
| 2011/0123688 | A1* | 5/2011 | Deo | B67D 1/0027 426/231 |

FOREIGN PATENT DOCUMENTS

| | | | |
|---|---|---|---|
| WO | 9807122 | A1 | 2/1998 |
| WO | 02081067 | A | 10/2002 |

* cited by examiner

APPARATUS, METHOD AND SYSTEMS FOR PROVIDING SELECTABLE LEVEL CARBONATED WATER

FIELD OF THE INVENTION

The present invention relates to apparatuses, methods and systems for providing selectable level carbonated water, and more particularly to apparatuses, methods and systems for providing on-demand production and dispensing of selectable levels of carbonated water at a liquid receiving area associated with, for example, a liquid dispenser of a refrigerated appliance.

BACKGROUND

Systems configured to provide carbonated water are typically configured to dispense carbonated water having a fixed level of carbon dioxide ($CO_2$). These systems are not capable of on-demand production of varying levels of carbonated water. For example, a system configured to dispense highly carbonated water is not capable of providing carbonated water with varying levels of $CO_2$ without diluting or exposing the carbonated water to ambient pressure for a certain period of time. Conversely, systems configured to produce medium to light carbonated water cannot immediately provide on-demand subsequent and sequential dispensing of highly carbonated water.

Therefore, a need has been identified in the art to provide an apparatus, method and system configured to produce and provide on-demand, immediate sequential dispensing of varying levels of carbonated water, such as carbonated water having a level of carbonation selected by an end-user.

Several factors affect the rate at which $CO_2$ is entrained in water. One method for entraining $CO_2$ into water is by agitating the two. Systems relying on agitation to entrain $CO_2$ into the water are configured to agitate at a constant rate, such as at a fixed RPM. In this instance, the agitation duration is longer for highly carbonated water (e.g., soda level) than for lightly carbonated water (e.g., sparkling water). Thus, the time required to produce and dispense carbonated water changes according to the levels of $CO_2$ requested.

Therefore, a need has been identified in the art to provide an apparatus, method and system configured to produce and provide on-demand, immediate sequential dispensing of varying levels of carbonated water having the same agitation duration by varying the rate of agitation.

SUMMARY OF THE INVENTION

In one embodiment, the invention is a method for on-demand, selectable level carbonated water production. At least one carbonating unit having a volume with an inlet in communication with a source of carbonating gas and noncarbonated water, an outlet for discharging carbonated water, and an agitator within the volume is provided. A level of carbonation for the carbonated water is selected and the rate of operation of the agitator is varied to correspond with the selected level of carbonation. Carbonated water having the selected level of carbonation is discharged on-demand to a liquid receiving area. In a preferred form, the agitation interval is generally the same for each selected level of carbonation.

In another embodiment, the invention is an apparatus configured for on-demand, selectable level carbonated water production. The apparatus includes at least one carbonating unit having a volume with an inlet in communication with a source of carbonating gas and noncarbonated water and an outlet for discharging carbonated water. An agitator is housed within the volume of the carbonating unit to which a variable speed actuator is operably connected. A controller is configured to operate the variable speed actuator. The controller has an operating parameter, such as a rate of operation for the agitator, corresponding to the selected level of carbonation for an agitation interval. In a preferred form, apparatus includes a first rate of operation corresponding to a fixed agitation interval and a second rate of operation corresponding to the same fixed agitation interval. The second rate of operation is generally greater than the first during the fixed agitation interval to increase the level of carbonation.

In another embodiment, the invention is a system for on-demand, selectable level carbonated water production. The system includes first and second carbonating units having a volume with an inlet in communication with a source of carbonating gas and noncarbonated water and an outlet for discharging carbonated water. An agitator is housed within the volume of each of the first and second carbonating units. A first variable speed actuator is operably connected to the agitator in the first carbonating unit and a second variable speed actuator is operably connected to the agitator in the second carbonating unit. A controller is operably connected to the first and second variable speed actuators. In a preferred form, the system includes one or more modes of operation, such as wherein the first actuator has a rate of operation corresponding to a first selected level of carbonation and the second actuator has a rate of operation corresponding to a second selected level of carbonation.

BRIEF DESCRIPTION OF THE DRAWINGS

While the specification concludes with claims particularly pointing out and distinctly claiming the invention, it is believed that the present invention will be better understood from the following description taken in conjunction with the accompanying drawings, in which:

DETAILED DESCRIPTION OF THE PREFERRED EMBODIMENTS

Figure 1:
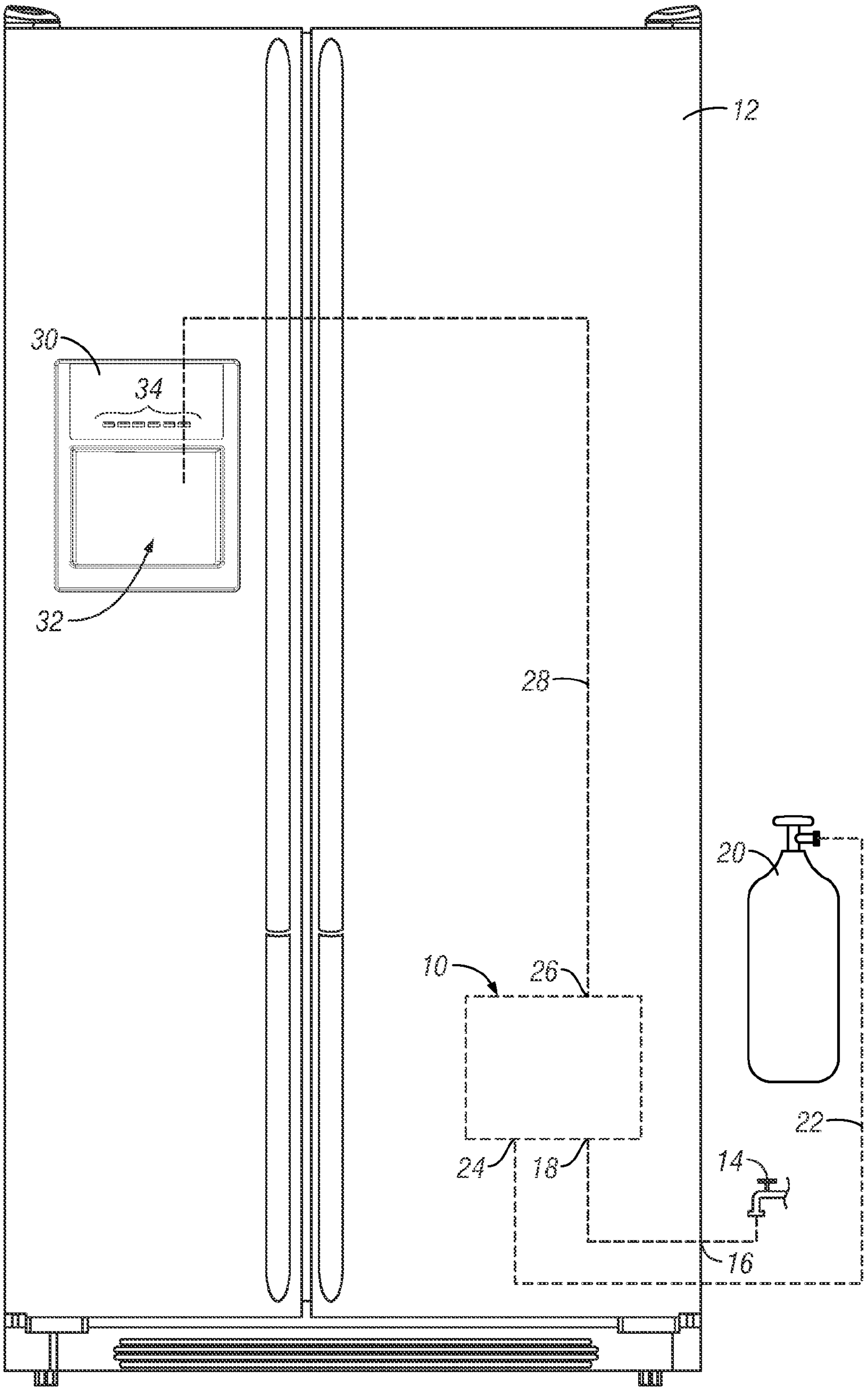
FIG. 1 is a front elevation view of a refrigerated appliance and carbonation unit according to an exemplary aspect of the present invention.
Figure 2:
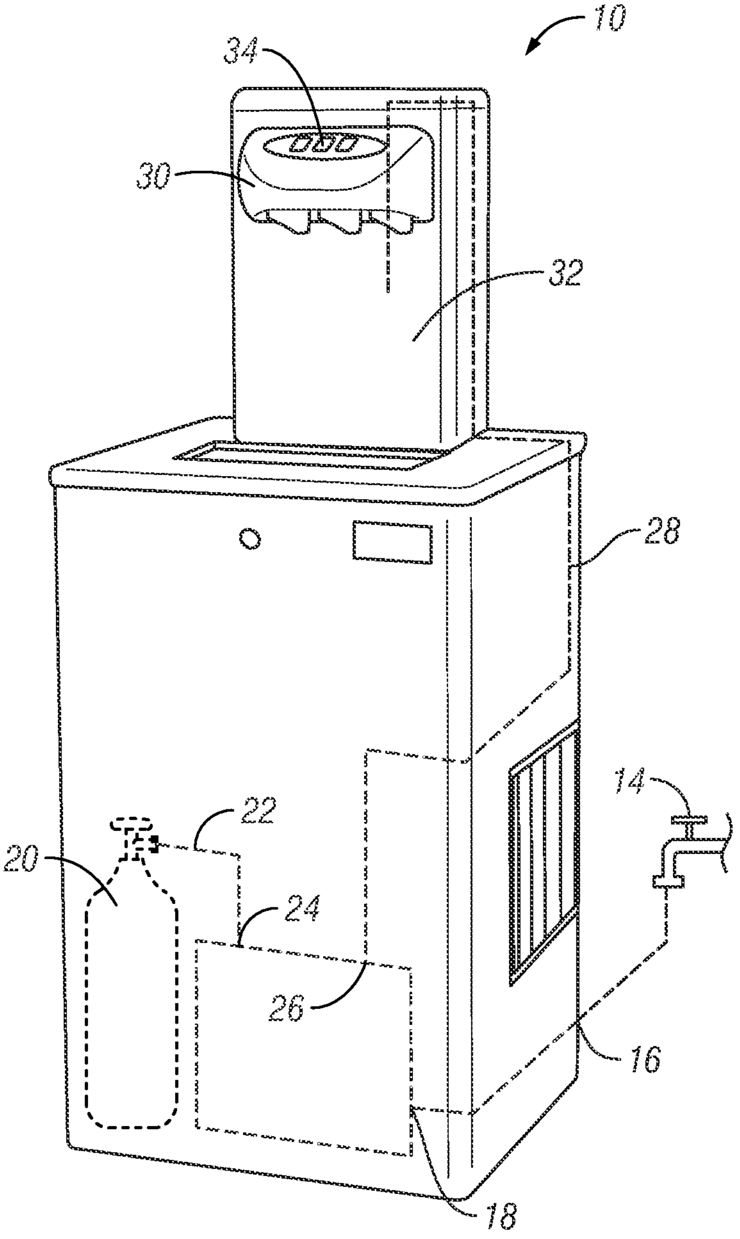
FIG. 2 is a perspective view of a beverage dispensing appliance and carbonation unit according to another exemplary aspect of the present invention.

FIGS. 1 and 2 illustrate implementation of a carbonation unit 10 into various platforms such as a refrigerated appliance shown in FIG. 1 and a beverage dispensing appliance shown in FIG. 2. By way of example, as previously indicated, FIG. 1 illustrates a refrigerated appliance 12 that is equipped with a carbonation unit 10 for dispensing carbonated water. In one exemplary configuration the carbonation unit 10 is housed within the refrigerated appliance 12. A $CO_2$ inlet 22 of the carbonation unit 10 is connected in communication via a $CO_2$ line 22 with a source of $CO_2$ gas 20. The $CO_2$ source 20 may be housed within the refrigerated appliance 12 or located at an adjacent or remote location. The carbonation unit 10 also includes a water inlet 18 connected in fluid communication via water line 16 to a water source 14. The water source 14 may be fed by a city, municipality or rural water source. Water source 14 may also be a well. It should be noted that the different sources typically operate at different line pressures. Additionally, the input pressure of water from the source 14 may increase or decrease depending on the location of the carbonation unit 10 relative to the source 14 (e.g., the distance from a pump house for a rural water supply). The carbonation unit 10 includes a carbonated water outlet 26 connected in fluid communication view carbonated water line 28 to a beverage dispenser 30. For example, the carbonated water line 28 may be connected in fluid communication with an indoor dispenser of the refrigerated appliance 12. The beverage dispenser 30 includes controls 34 for selectively operating the carbonation unit 10 and dispensing carbonated water at the beverage dispensing area 32.

In operation, a user is able to select a specific level of carbonation using the controls 34 at the beverage dispenser 30. The carbonation unit 10 operates for a specific duration to produce carbonated water at the requested level of carbonation. Immediately following, the next user may select a different carbonation level using the controls 34 at the beverage dispenser 30. The carbonation unit 10 operates for a specific duration to produce the carbonated water at the next user's requested level of carbonation. The dispensions from the beverage dispenser 30 at the beverage dispensing area 32 may be sequential, one immediately following the other without delay regardless of the difference in the carbonation level requested by sequential users. The details for sequential operation of the carbonation unit 10 are further described in the written description below.

The carbonation unit 10 may also be configured within a beverage dispensing appliance, such as the beverage dispensing appliance 36 illustrated in FIG. 2. The carbonation unit 10 may be configured to be housed within the beverage dispensing appliance 36. Alternatively, the carbonation unit 10 may be housed within a separate housing connected in operable communication with the beverage dispensing appliance 36. For example, the carbonation unit 10 may be housed within the beverage dispensing appliance 36, adjacent to or at a remote location. As shown, the carbonation unit 10 is housed within the beverage dispensing appliance 36 and includes a water inlet 18 connected in fluid communication via water line 16 to a water source 14. The unit 10 also includes a $CO_2$ inlet 24 connected in communication via $CO_2$ line 22 to a source of $CO_2$ 20. The $CO_2$ source 20 may be housed within the beverage dispensing appliance 36, adjacent to or at a remote location. The carbonation unit 10 includes a carbonated water outlet 26 connected in fluid communication via carbonated water line 28 with the beverage dispenser 30. The beverage dispenser 30 includes controls 34 for controlling operation of the carbonation unit 10 and dispensing carbonated water at the beverage dispensing area 32. In operation, a beverage is selected having a specific carbonation level using controls 34 on the beverage dispenser. The carbonation unit 10 operates for a specific duration while simultaneously dispensing the carbonated water at the requested level of carbonation at the beverage dispensing area 32. Subsequent dispensing selected at the controls 34 of the beverage dispenser 30 are dispensed instantaneously upon selection at the level of carbonation selected. Carbonation unit 10 is configured to allow for sequential dispensing of carbonated water at varying levels of carbonation without requiring delay during dispensions. Details regarding the operation of the carbonation unit 10 configured to provide instantaneous and sequential dispensing of varying levels of carbonated water is further described below.

Figure 3:
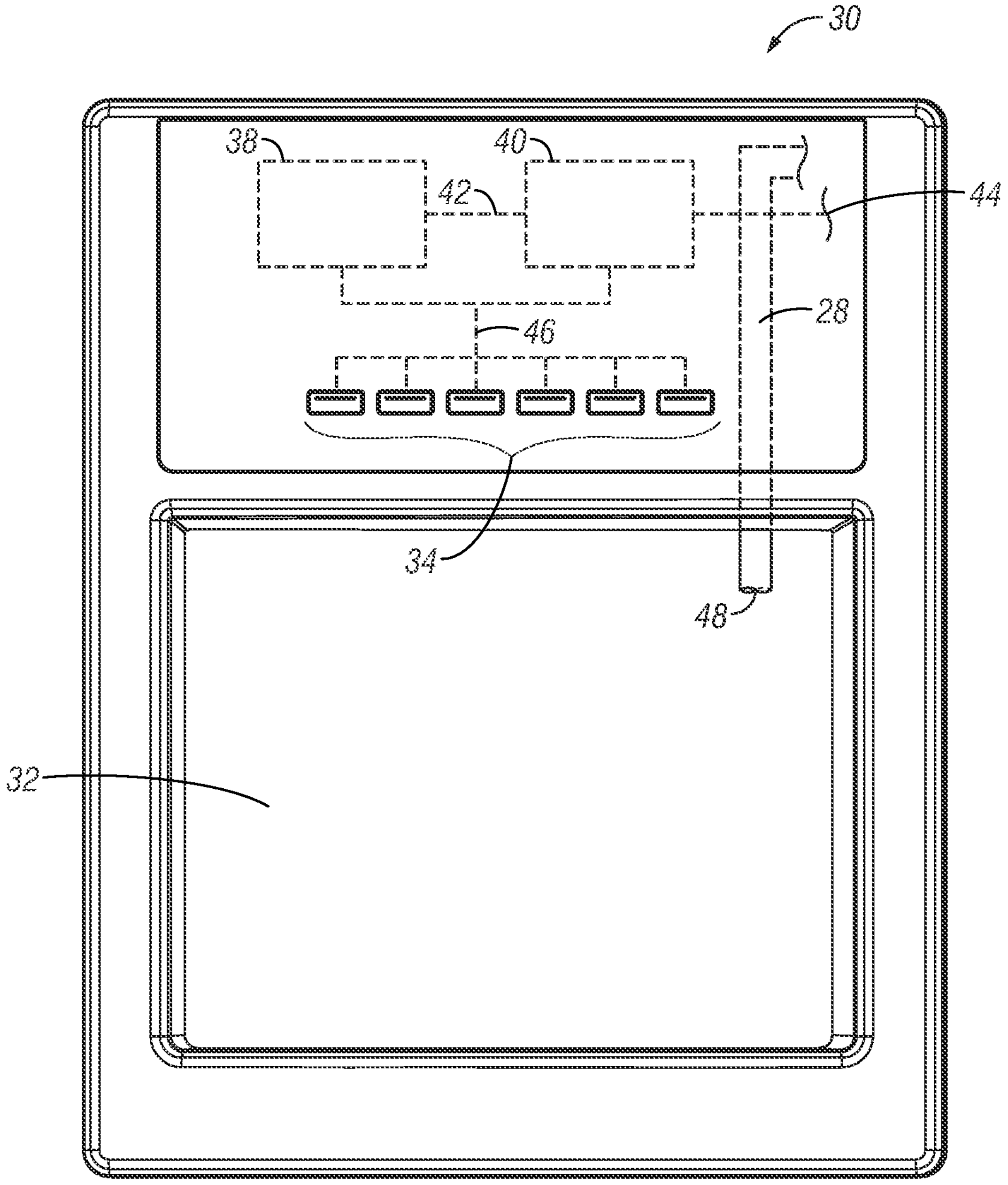
FIG. 3 is an exemplary illustration of a dispensing interface for the carbonation unit.

FIG. 3 is a dispensing interface for operatively controlling the carbonation unit 10 of the present invention. The interface illustrated in FIG. 3 is but one of example of an interface capable of operably controlling the carbonation unit 10 illustrated in FIGS. 4A, 4B and 5. The operating interface of the beverage dispenser 30 includes one or more controls 34 connected in operable communication with the carbonation unit 10. Controls 34 receive input from the user for selecting a beverage type and/or specifically a level of carbonation for the carbonated water to be dispensed alone or for use in a beverage. The carbonated water and/or beverage with the carbonated water is dispensed from the carbonation unit 10 via carbonated water line 28 out the carbonated water discharge 48 at the beverage dispensing area 32. The controls 34 are connected in operable communication with a controller 38 and/or data store 40 via control link 46. The controller 38 is also operatively connected with the data store 40 via a control link 42. The controls 34, controller 38 and data store 40 are connected in operable communication with the carbonation unit 10 via control link 44. The data store 40 is configured to store algorithms, agitation intervals, agitation curves, etc., for operating the carbonation unit 10. The controller 38 may be a programmable logic controller (PLC) for communicating with the data store 40 and controlling operation of the carbonation unit 10. The data store 40 may also be used to record operation of the carbonation unit 10, such as for example, recording temperature and pressure of water being used in the carbonation process, the output carbonation level, the agitation interval, agitation speed, flow rates of water, $CO_2$ or other fluids and gases, the dispensing interval, $CO_2$ operating pressures, etc. Such programming can provide specific or desired drink output for a desired beverage, $CO_2$ concentration, temperature or other available parameter.

Figure 4A:
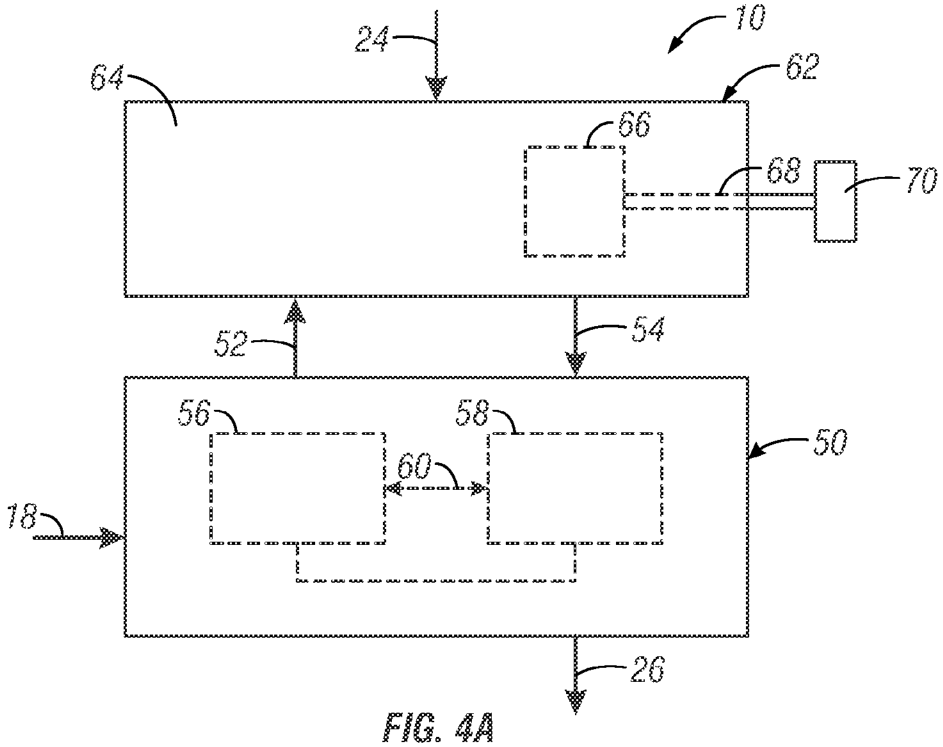
FIG. 4A is an illustration of an exemplary embodiment of the carbonation unit of the present invention.
Figure 4B:
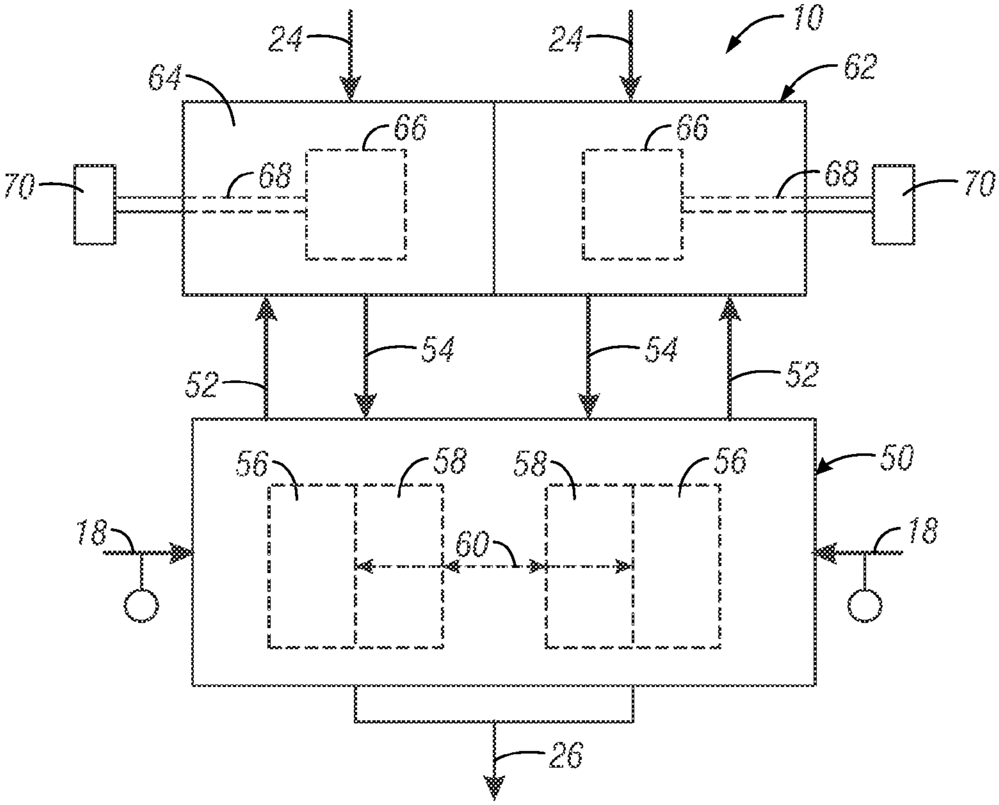
FIG. 4B is an illustration of another exemplary embodiment of the carbonation unit of the present invention.

FIGS. 4A and 4B illustrate exemplary embodiments of a carbonation unit 10 according to varying aspects of the present invention. The embodiment of the carbonation unit 10 illustrated in FIG. 4A includes a liquid flow control unit 50. The liquid flow control unit 50 is configured generally to control flow between the inputs and outputs to the carbonation unit 10. For example, the liquid flow control unit 50 includes a water inlet 18 connected, for example, to a water source 14 such as illustrated in FIGS. 1 and 2. It also includes a carbonated water outlet 26 such as illustrated in FIGS. 1 and 2 connected in fluid communication with a liquid dispenser via a carbonated water line 28. A liquid flow control unit 50 controls the communication of water (e.g., liquid flow rate) to the agitator 62 and communication of carbonated water from the agitator 62 to a liquid dispenser. The liquid flow control unit 50 includes both carbonated water chambers 56 and water chambers 58 connected in corresponding communication and operating collectively as a single chamber separated by a flow controller 60. Further description of the components of a liquid flow control unit 50 designed to perform the process of controlling the flow of water and carbonated water into and out of the agitator 62 and suitable for use according to the invention is set forth in U.S. patent application Ser. No. 12/297,539 (Ludgate 332 Ltd, London, England), which is herein incorporated by reference in its entirety. Operably connected to the liquid flow control unit 50 is a carbonator or, as referred to herein, an agitator 62 configured to entrain carbon dioxide gas into water for preparing carbonated water. The agitator 62 includes a water inlet 52 connected in fluid communication with the liquid flow control unit 50 and a carbonated water outlet 54 connected in fluid communication with the liquid flow control unit 50. The water inlet 52 and carbonated water outlet 54 may be configured to occupy the same line, such as for example, to pass water into the agitator 62 through the same line that carbonated water is passed out of the agitator 62 into the liquid flow control unit 50 by use of a bidirectional valve. The agitator 62 includes a volume 64 for housing a specific capacity of water, such as for example, 50 ccs of water (roughly 1.7 ounces). The volume equates to roughly one-fourth of a serving of a standard 8 ounce dispension. Thus, according to this one exemplary embodiment of the invention, the entire volume 64 of carbonated water in the agitator 62 would dispense four times for a single 8 ounce drink. Other volumes are contemplated as would permit rapid preparation of a specific level of carbonated water selected by the user. The agitator 62 includes a $CO_2$ inlet 24 connected in communication with a $CO_2$ source via a $CO_2$ line 22 such as illustrated in FIGS. 1 and 2. Within the volume 64 of the agitator 62 resides an agitating member 66, such as for example, a paddle or other member having sufficient surface area so as to entrain the carbon dioxide gas in the head space of the volume 64 in the water within the volume of the agitator 62. The agitating member 66 is operatively connected to an agitation controller 70 via an agitating member control 68. According to one aspect of the invention, the agitating member 66 is driven by an arm extending into the volume 64 and connected to agitation controller (e.g., a motor) under operable control of the controller 38 illustrated in FIG. 3. The agitating member may also be operated by a magnetic clutch to maintain a continuous seal of the volume 64. The agitation controller 70 is configured to operatively control the agitating member 66 for a specific agitation interval and at a specific speed (e.g., rpm) corresponding to the specific level of carbonated water requested by a user or beverage preparation process. There are several variables that impact the carbonation process, which are addressed in the detailed description below. For example, the speed of flow (e.g., volumetric flow) of water into and carbonated water out of the agitator 62, the rate of agitation, the agitation duration and other variables are several factors that impact the level of carbonation in each dispension of carbonated water.

FIG. 4B is an illustration of a carbonation unit 10 configured to provide a continuous stream of carbonated water at varying levels of selected carbonation to a dispenser such as illustrated in FIGS. 1-3. Similar to the carbonation unit 10 illustrated in FIG. 4A, the unit in FIG. 4B includes a liquid flow control unit 50. The liquid flow control unit 50 includes a pair of water inlets 18 connected in fluid communication with a water source such as illustrated in FIGS. 1 and 2. Pairs of carbonated water chambers 56 and water chambers 58 receive, temporarily store, and discharge water and carbonated water by operation of a flow controller 60 and one or more valves connected in fluid communication with the carbonated water chambers 56 and water chambers 58. The carbonated water is dispensed from the liquid flow control unit 50 via carbonated water outlet 26. Water and carbonated water is communicated to and from the liquid flow control unit 50 to the pair of agitators 62. Further description of the components of a liquid flow control unit 50 designed to perform the process of communicating water to and carbonated water from the agitator 62 (i.e., carbonator) and suitable for use according to the invention is set forth in U.S. patent application Ser. No. 12/297,539 (Ludgate 332 Ltd, London, England), which is herein incorporated by reference in its entirety. According to one embodiment of the invention, one side of the liquid flow control unit 50 is connected in fluid communication with one side of the agitator 62 and the other side of the liquid flow control unit 50 is connected to the opposite side of the agitator 62. The agitator 62 includes a pair of volumes 64. Each volume is connected in fluid communication with one side of the liquid flow control unit 50 via a water inlet 52 and a carbonated water outlet 54. The water inlet 18 may include one or more sensors for detecting the temperature and/or the pressure of the water entering into the liquid flow control unit 50 from the water source. The CO2 pressure from the carbon dioxide source may also be monitored using one or more sensors (not shown). Each chamber of the agitator 62 includes an agitating member connected in operable communication with an agitation controller 70 via an agitation member control 68. Each chamber also includes a $CO_2$ inlet 24 operably connected to a source of $CO_2$ such as illustrated in FIGS. 1 and 2. Generally speaking, the liquid flow control unit 50 is configured to fill one side (e.g., the left side volume) with water while discharging carbonated water from the other side (e.g., the right side volume). Each time the liquid flow control unit 50 fills the agitator 62 with a charge of water, carbonated water stored in the liquid flow control unit 50 is dispensed via the carbonated water outlet 26. For example, while one side of the agitator 62 is operating the other side is either being filled with water or emptied of carbonated water so that a continuous stream of carbonated water prepared in the individual chambers of the agitator 62 and stored in carbonated water chambers within the liquid flow control unit 50 is discharged through the carbonated water outlet 26 connected in fluid communication with a liquid dispenser via a carbonated water line 28, such as illustrated in FIGS. 1 and 2. As is described in more detail below, the volume 64 within each side of the agitator 62 is roughly 50 ccs or 1.7 ounces. Therefore, very little time is required to carbonate the water within each respective volume to the level requested by the user. Thus, between the stored carbonated water within the liquid flow control unit 50 and the carbonated water being prepared in the agitator 62 a continuous stream of carbonated water is presented at the liquid dispenser at the level of carbonation selected by the user.

Figure 5:
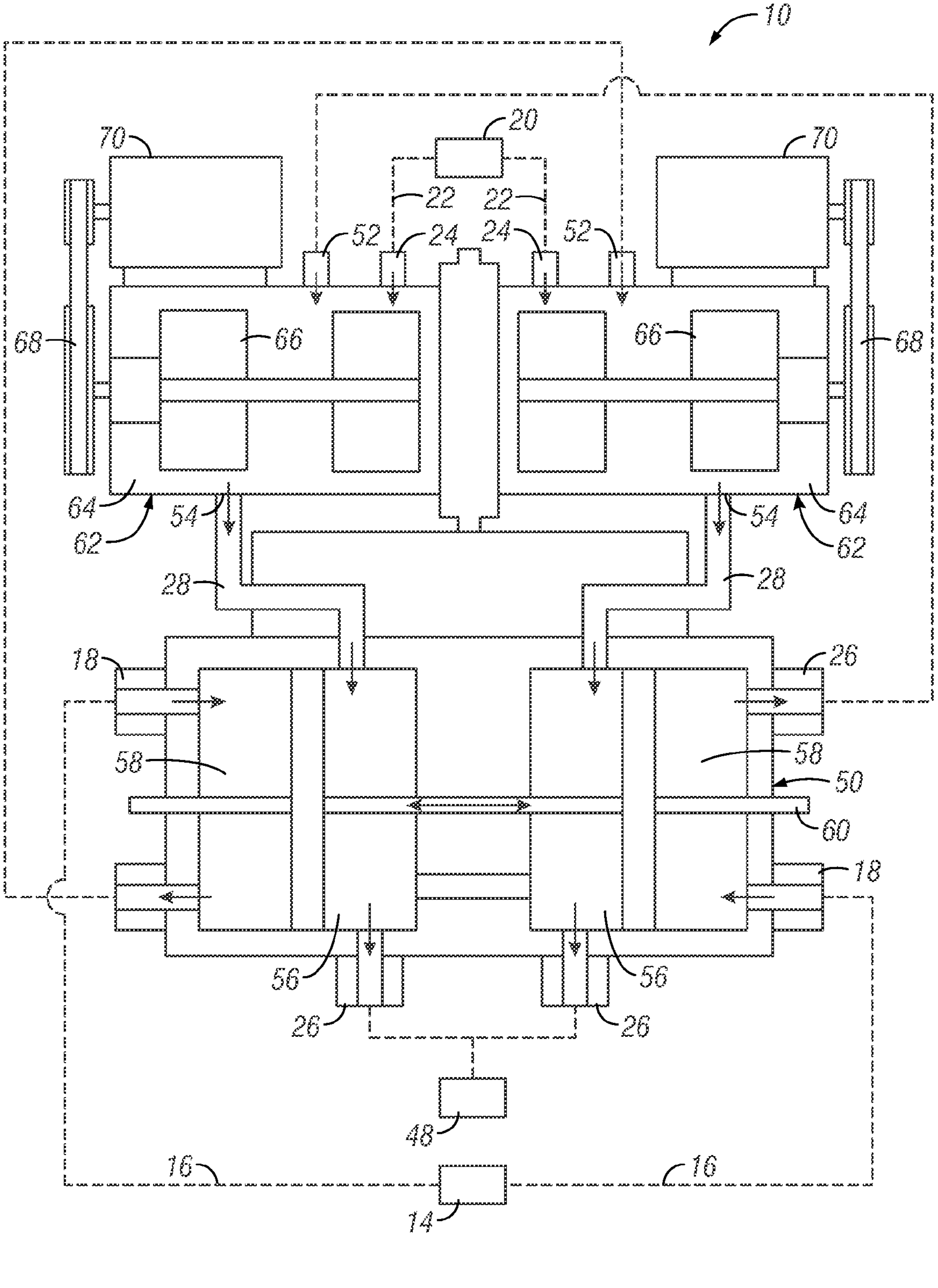
FIG. 5 is an illustration of a liquid flow control and agitation unit according to an exemplary aspect of the present invention.

FIG. 5 illustrates, for example, an embodiment of a carbonation unit 10 according to an exemplary aspect of the present invention. Further description of the components and operation of the liquid flow control unit 50 shown in FIG. 5 suitable for use according to the present invention is set forth in U.S. patent application Ser. No. 12/297,539 (Ludgate 332 Ltd, London, England), which is herein incorporated by reference in its entirety. The volume 64 within each agitator 62 is preferably equal to the volume of the cylinders 56, 58 within the liquid flow control unit 50 so that the amount of carbonated water discharged from a chamber of one of the cylinders in the liquid flow control unit 50 is the same amount of carbonated water drawn into the carbonated water chamber

56. Thus, upon every stroke of the flow controller 60 the volume 64 (e.g., left side volume) of one agitator 62 is completely charged, for example, with water while the volume 64 (e.g., right side volume) of the other agitator 62 is completely emptied of carbonated water. In this manner, one side of the agitator is being filled with water and the other side is discharging carbonated water and vice a versa each stroke of the flow controller 60.

Figure 8:
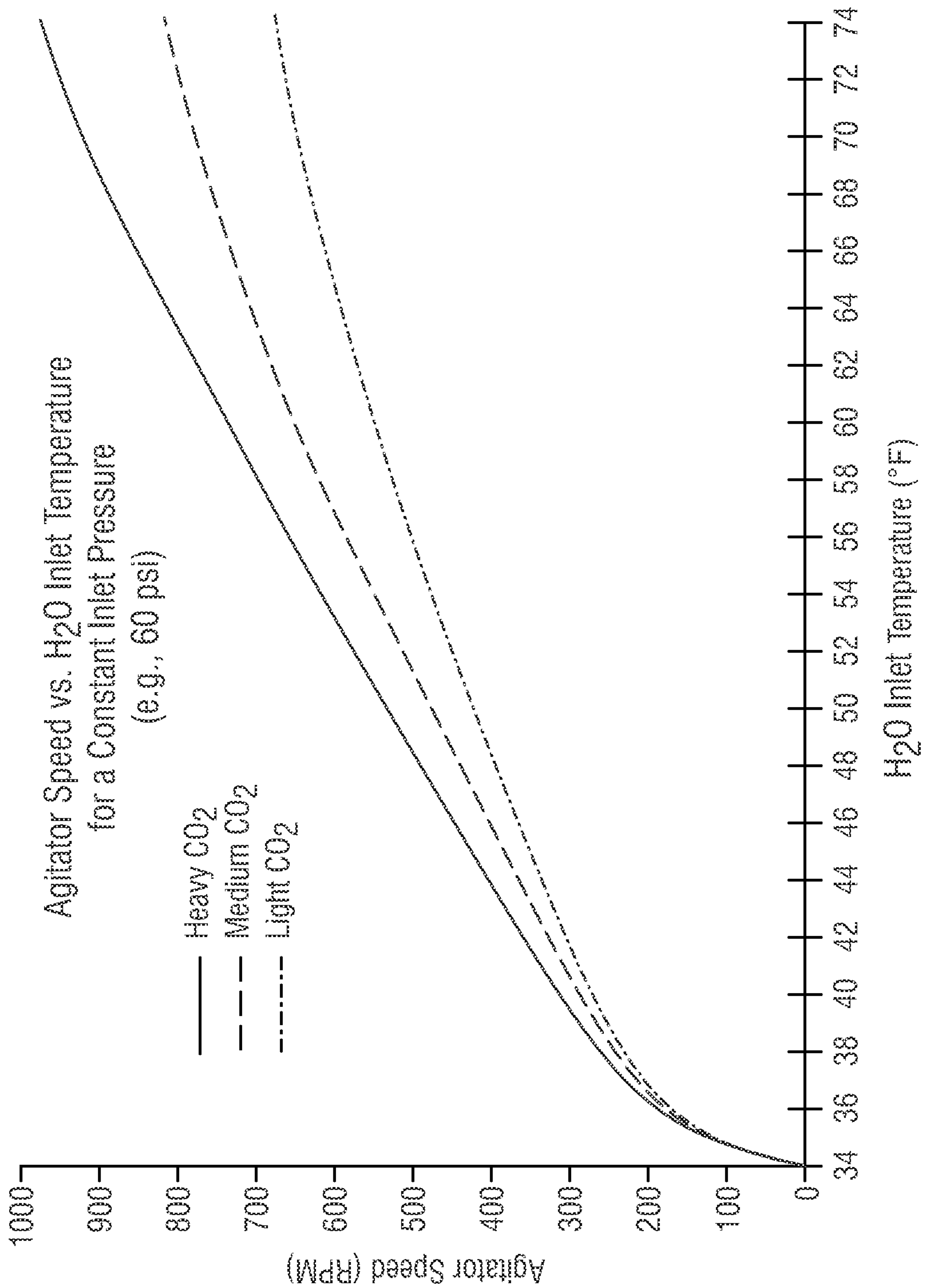
FIG. 8 is a plot illustrating a control curve for agitator speed versus water temperature at a fixed water inlet pressure.
Figure 9:
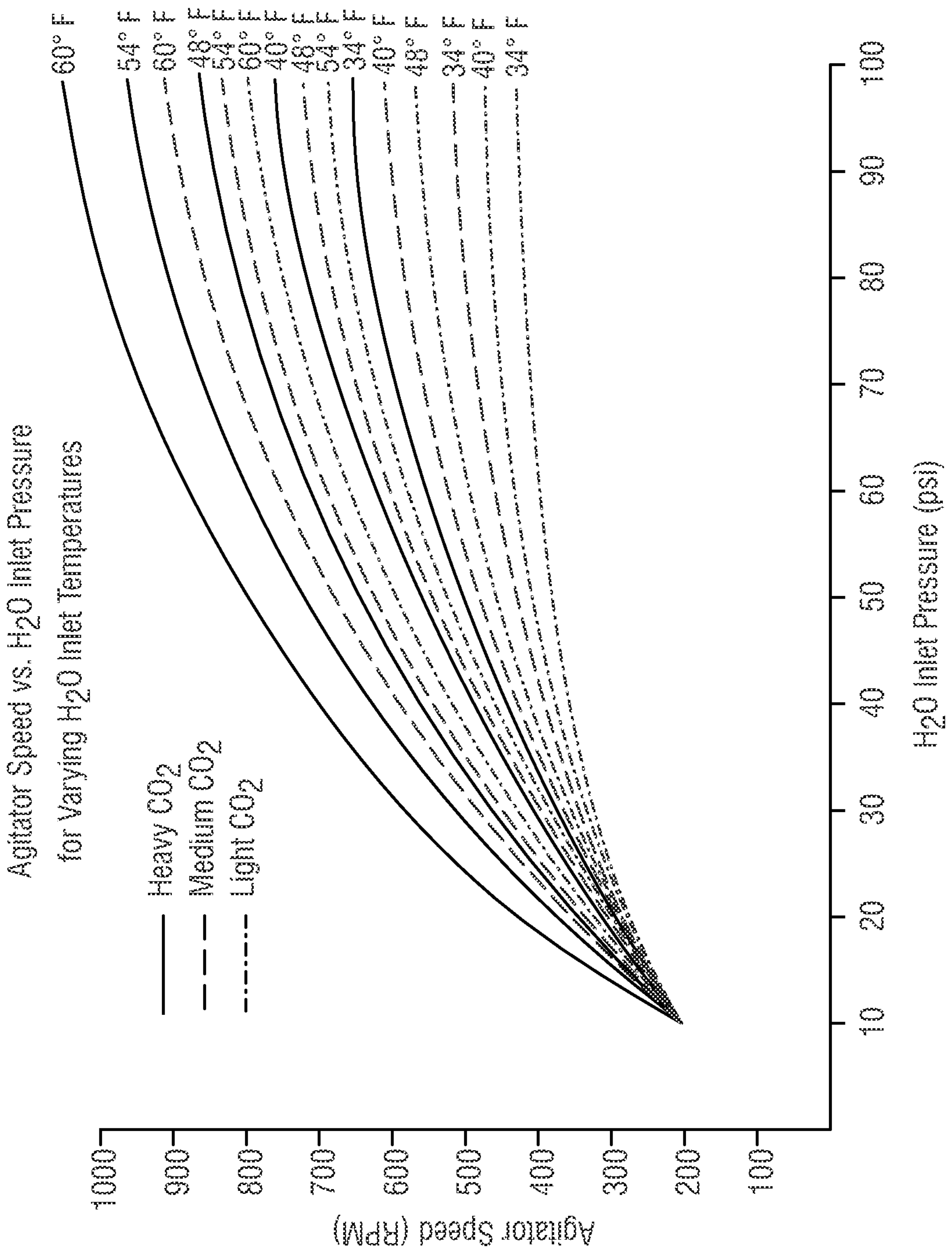
FIG. 9 is a plot illustrating a set of control curves for agitator speed water inlet pressure at varying water temperatures.
Figure 10:
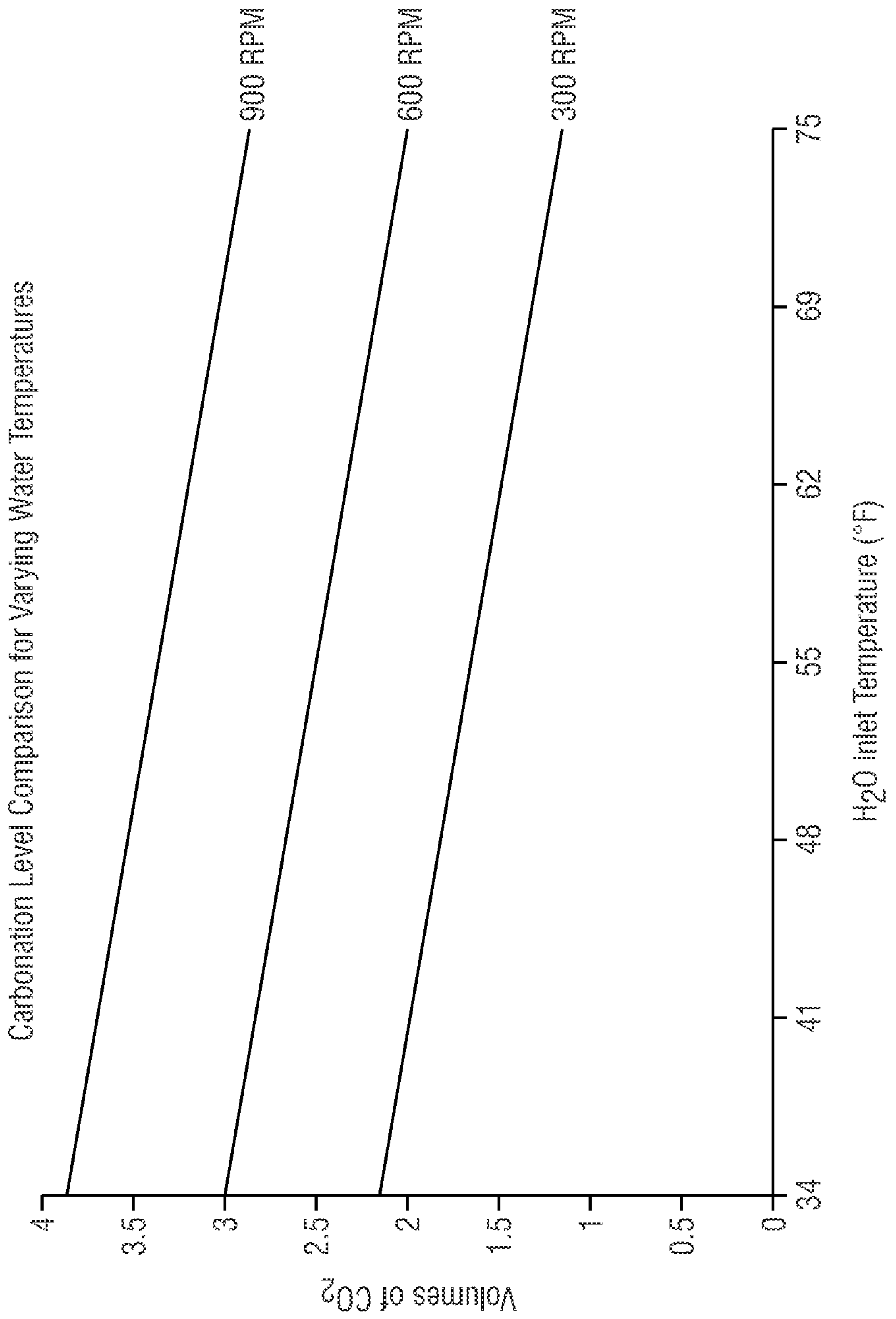
FIG. 10 is a plot illustrating a set of fixed agitator speeds for volumes of carbonation versus water temperature of the inlet water.
Figure 11:
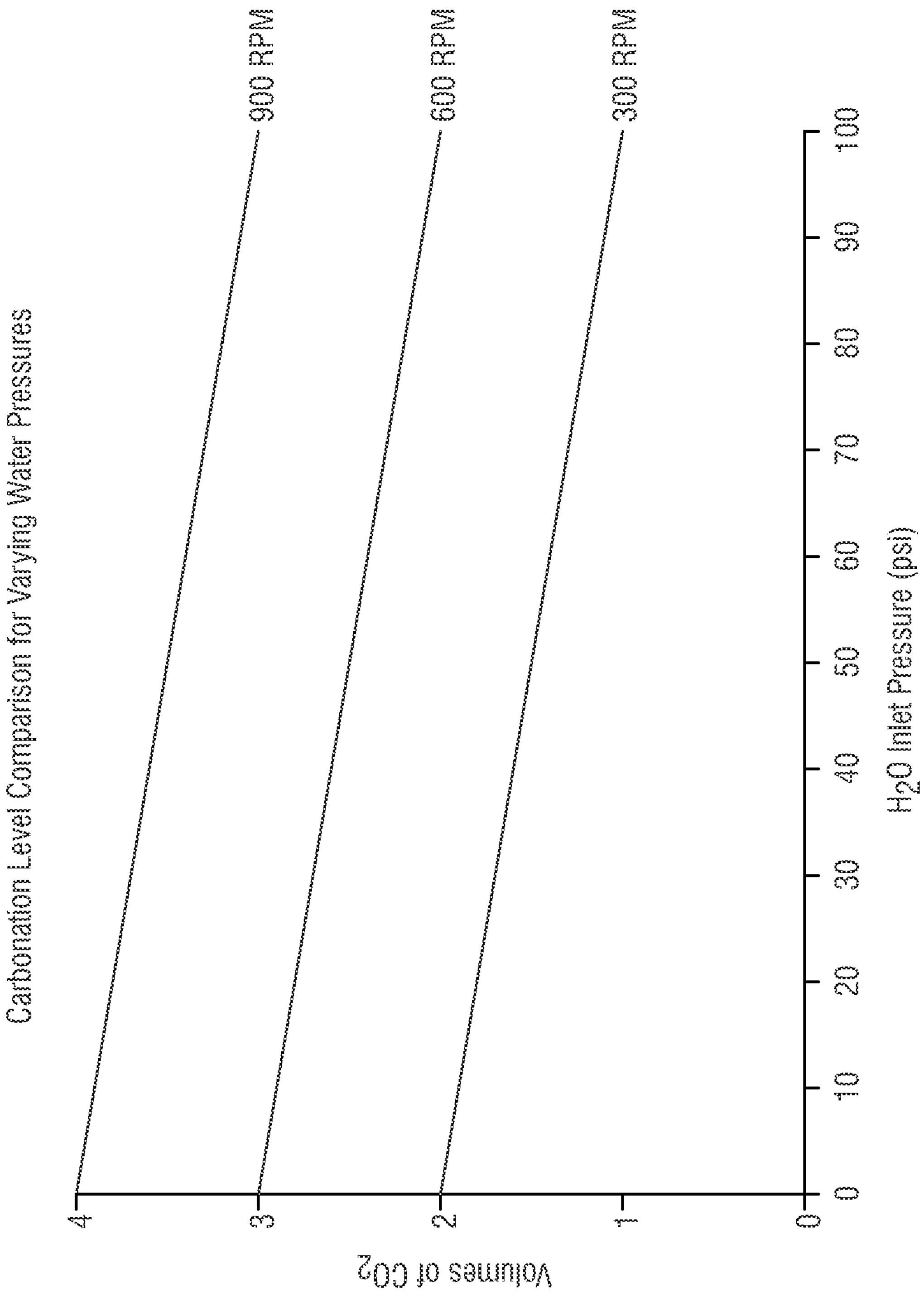
FIG. 11 is a plot illustrating a set of fixed agitator speeds for volumes of carbonation versus water pressure of the inlet water.

The carbonation unit 10, shown as an exemplary embodiment in FIG. 5, includes a liquid flow control unit 50 as previously described. The liquid flow control unit 50 operates to move water into and carbonated water out of an agitator 62 in a manner so as to provide a continuous flow of carbonated water at a beverage dispenser such as illustrated in FIGS. 1 and 2. For example, the liquid flow control unit 50 includes one or more water inlets 18 connected in fluid communication to a water source 14 via a water line 16. Water from the water source 14 is introduced into the water chambers 58. The flow controller 60 communicates water within the water chambers 58 to the water inlets 52 connected in fluid communication with the volume 64 of each respective agitator 62. Ideally, one water chamber fills with water while the contents of the other water chamber is dispensed/communicated to an agitator 62 via water inlet 52. Each of the volumes 64 of each respective agitator 62 is connected in communication with a carbonated gas source 20. Gas is communicated from the source 20 through a $CO_2$ line 22 into the respective $CO_2$ inlets 24 for each agitator 62. During operation, both $CO_2$ gas from the source 20 and water from the source 14 are being communicated into the respective volume 64 of each agitator 62. The rate at which water is communicated into each agitator 62 via water inlets 52 is generally dependent upon the water pressure of the water source 14. The present invention may be configured to operate at a fixed water inlet pressure or varying water inlet pressures. For example, in the case where the water source 14 varies in water pressure and/or temperature the carbonation unit 10 adjusts to accommodate for the variation in the water pressure or temperature by varying the speed of the respective agitating members in each agitator 62, as best illustrated by the plot shown in FIG. 9. Thus, depending upon the desired level of carbonation, the rate of agitation is adjusted dependent upon the temperature of the water and the water pressure as shown in FIG. 9. Also, depending upon whether the selected carbonation level is, for example, heavy $CO_2$ or medium $CO_2$ or light $CO_2$, the rate of agitation is adjusted to accommodate the variation in the water inlet pressure and temperature of the water. Note that as the inlet water pressure and temperature increases, the rate of agitation also generally increases. Alternatively, as previously indicated, the water inlet pressure may be regulated using a flow pressure regulator positioned between the water source 14 and the water inlet 52. In the case where the water inlet pressure is regulated to a desired operating pressure, such as for example 60 psi, FIG. 8 illustrates the rate of agitation required for varying carbonation levels dependent upon varying water temperature when the inlet water pressure is constant. The inlet water pressure affects the dwell time of water in the agitator and thus the level of carbonation of any output from the agitator. For example, a constant inlet water pressure results in a constant flow rate through the agitators. Assuming all other variables are constant (e.g., water temperature, carbon dioxide pressure, agitation rate, etc.) a constant water inlet pressure results in a constant flow rate and generally constant levels of carbonation in the carbonated water output from the agitator. A higher inlet water pressure results in a higher flow rate (less dwell time in the agitator) and a lower water pressure a lower flow rate (more dwell time in the agitator)). Increasing the dwell time in the agitator increases the carbonation level of the carbonated water output assuming all operating variables are constant. Conversely, decrease the dwell time of water in the agitator decreases the carbonation level of the carbonated water output assuming all operating variables are held constant. Since it is difficult and often more expensive to insure that all operating variables are held generally constant, the present invention provides for a variable agitation rate to account for any changes in the operating parameters (e.g., water pressure (flow rate), water temperature, carbon dioxide pressure, etc.) to provide a desired level of carbonation in carbonated water output from the agitator. For example, if a heavy concentration is selected by the user, the agitator operates at a higher speed which is varied according to the water temperature as shown in FIG. 8. Conversely, if the user selects a light carbonation such as a sparkling water, the agitator 62 operates at a lower speed with some variation in the speed depending upon the temperature of the water from the water source. Thus, the rate of agitation (i.e., the rate of incorporation of carbon dioxide into the water) may be varied continuously or incrementally dependent upon varying operating conditions such as the water pressure, the flow rate of water, the water temperature, the amount of water in the volume 64 of each of the carbonators, the rest time during dispensing (i.e., dwell time), etc. On the other hand, if the water inlet pressure is constant from the source or by use of a regulator and the carbonation source pressure is constant, the agitators operating at a fixed speed (e.g., rpm) as shown in FIG. 10 will produce carbonated water with decreasing volumes of $CO_2$ as the temperature of the inlet water increases. Thus, the agitator speed can be continuously controlled (i.e., the rpm of the agitator continuously adjusted) as shown in FIG. 8 to accommodate for the decreasing volume of $CO_2$ in the carbonated water as the temperature of the inlet water increases. Similarly, assuming that the inlet water temperature and carbonation source pressure is generally constant, the agitators operating at a fixed speed (e.g., rpm) as shown in FIG. 11 will produce carbonated water with decreasing volumes of $CO_2$ as the pressure of the inlet water increases. Thus, the agitator speed can be continuously controlled (i.e., the rpm of the agitator continuously adjusted) to accommodate for the decreasing volume of $CO_2$ in the carbonated water as the pressure of the inlet water increases (see for example, FIG. 9). In summary, the pressure of the carbonation source, the inlet water pressure and the agitation rate are all variables that can be controlled based on feedback from the carbonation process to ensure accurate $CO_2$ levels in the carbonated water product. According to a preferred aspect of the present invention, the rate of agitation is adjusted variably or continuously to account for differences that may result in the pressure variables (i.e., carbonation source and inlet water pressure). The agitation rate can be adjusted immediately to account for an operating condition that might alter the volumes of $CO_2$ in the carbonated water from the level requested.

As illustrated in FIG. 5, each agitator 62 has a volume 64 within which an agitating member 66 is housed. Each agitating member 66 is connected to an agitating member control 68 that is driven by, for example, an agitation controller 70 at varying rates of operation depending upon the level of carbonation selected by the user. According to one embodiment of the invention, a motor is connected in operable communication with a paddle within the volume 64 of each agitator 62 to drive the paddle at varying speeds to entrain carbon dioxide into the water for preparing carbonated water with varying $CO_2$ levels. The carbonated water prepared within each respective volume 64 of each agitator 62 is communicated through respective carbonated water outlets 54 into carbonated water chambers 56 within the liquid flow control unit 50. The flow controller 60 communicates the carbonated water out of each respective carbonated water chamber 56 through carbonated water outlets 26 connected, for example, in fluid communication with a carbonated water discharge 48 such as also illustrated in FIG. 3. The carbonation unit 10 is able to provide a continuous stream of carbonated water by preparing a batch of carbonated water in one of the agitators 62 while carbonated water is being dispensed, and dispensing that batch of carbonated water while another batch of carbonated water is being prepared in the opposing agitator 62. Both agitators can be operated simultaneously. While one is dispensing or filling the other may be agitating or vice versa. The flow of water into and carbonated water out of the agitator 62 may be controlled according to the embodiments of the liquid flow control unit 50 shown and described in U.S. patent application Ser. No. 12/297,539 (Ludgate 332 Ltd, London, England), which is herein incorporated by reference in its entirety.

Figure 6:
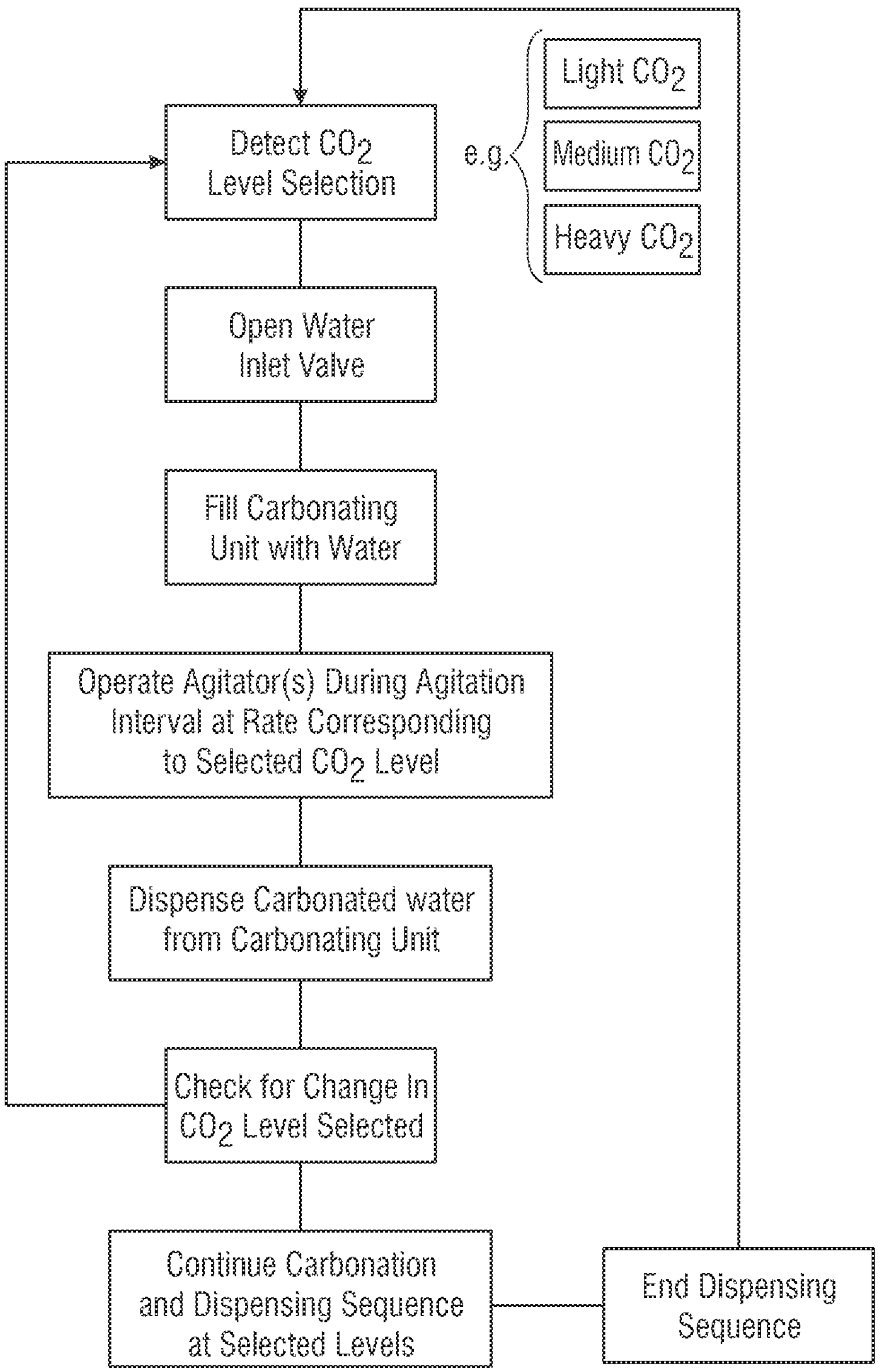
FIG. 6 is a flow diagram illustrating operation of the carbonation unit according to an exemplary aspect of the invention.
Figure 7:
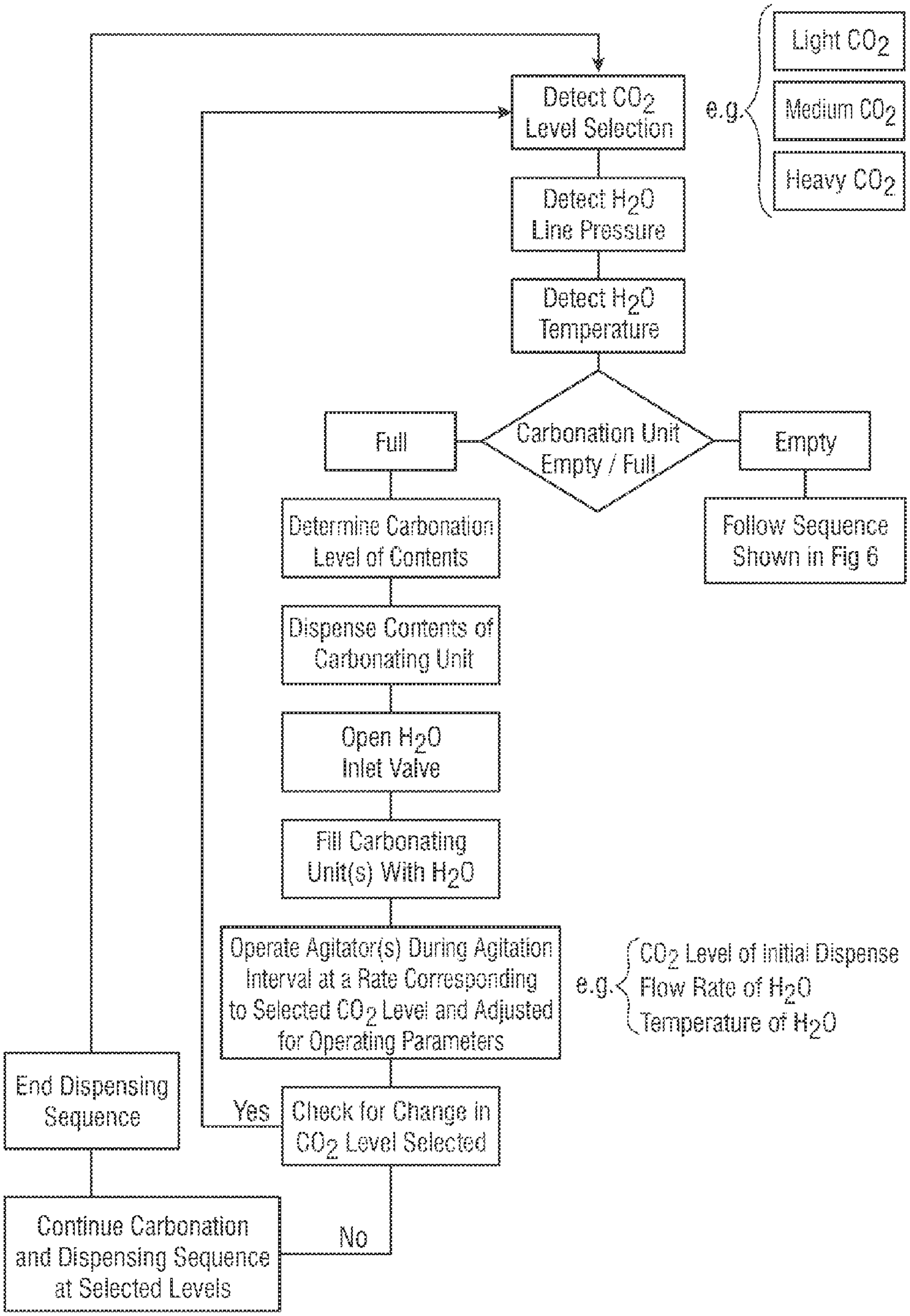
FIG. 7 is another flow diagram illustrating operation of the carbonation unit according to an exemplary aspect of the invention.

FIGS. 6-7 illustrate operational flow charts for embodiments of the present invention. According to one aspect of the invention, the controller 38 illustrated in FIG. 3 is programmed to detect a $CO_2$ level selection by a user operating one or more of the controls 34. For example, the user may select a light carbonated water (e.g., sparkling water), a medium carbonated water, or a heavy carbonated water (e.g., soda water). The volumes 64 of each of the respective agitators 62 are filled with water by opening the water inlet valve. According to one embodiment of the invention, the volume 64 of an agitator 62 is filled with an amount (e.g., 50 ccs) of water. The present invention contemplates that other volumes of liquid may also be used. The valve to the carbonating gas source is generally always open to allow carbon dioxide to be communicated from the source into the volume 64 of each respective agitator 62 so that carbonating gas is always pressurizing the volume 64. The carbon dioxide generally resides within the head space of the volume 64. The controller 38 operates the agitators for a specific agitation interval and at a rate corresponding to the selected level of carbonation. This rate, as previously indicated and as shown in FIGS. 8 and 9, may be varied depending upon such factors as the water pressure and the temperature of the water within the respective volumes 64 of each agitator 62. For example, the agitation duration may be a fixed interval; however, the rate of agitation may be varied to prepare varying levels of carbonated water depending upon the selection by the user. Therefore, the agitation duration or interval is preferably not adjusted based on the level of carbonation selected or other factors such as water temperature and/or water pressure. Rather than changing agitation interval or duration, the rate of agitation of the agitator 62 may be varied to accommodate variations in the water pressure, water temperature, and other operating variables of the carbonation unit. Upon completion, the carbonated water prepared within each respective volume 64 is dispensed sequentially from each respective agitator 62 to provide a continuous stream of carbonated water to the carbonated water dispenser, such as the discharge 48 shown in FIG. 3. The system continues to dispense the selected level of carbonated water and monitors for a change in the carbonated water levels selected at the controls 34. At the end of the dispensing sequence the controller 38 continues to monitor or detect for a carbonated water level selection by a user at the controls.

FIG. 7 illustrates another exemplary flow chart for a mode of operation of the present invention. The controller 38 shown in FIG. 3 is configured to detect the $CO_2$ level selection at the controls 34 from a user's input. The controls 34 may include selections for varying levels of carbonated water. For example, the user may be able to select a light carbonated water having roughly 2.5 vols of carbon dioxide, a medium carbonated water having, for example, 3.0 vols of carbon dioxide, or a heavy carbonated water (e.g., soda, water having 3.4-3.7 vols of carbon dioxide). The carbonation units 10 may also be configured with inline sensors, such as for example, a sensor to detect the water pressure from a water source, carbonation sensor to detect a level of carbonation and/or a temperature detector to detect the temperature of the water. The detected pressure, carbonation and temperature may be used to adjust the rate of agitation according to the plots shown in FIGS. 8 and 9. During operation, the system also detects whether there is water within the volume 64 of each respective agitator 62. If the volume 64 within each agitator 62 is determined to be empty, the system may be configured to follow the operating protocol illustrated in FIG. 6. Alternatively, the volume 64 within one or both of the agitators 62 may house as a batch of carbonated water. In this case, the system (e.g., the controller 38 shown in FIG. 3) may be configured to determine the carbonation level of the batch within each volume 64. Alternatively, the system may be configured to dispense the existing batch at its specific level of carbonation and subsequently alter each new batch to dispense a cumulative batch of carbonated water having the user's selected level of carbonation. For example, water residing within a volume 64 of agitator 62 under pressure from a carbonating gas source will have a high concentration of carbonated gas the longer it sits under pressure of a carbonating gas source. To offset the high concentration of carbonated gas in the first batch dispensed, the system may be configured to prepare a batch having a lower carbonation level than the requested level to offset the previous batch having the higher level of carbonation. As further shown in FIG. 7, the contents of each volume 64 within the carbonating unit 10 are sequentially dispensed to, for example, a carbonated water discharge as shown in FIG. 3. The water inlet valve is then opened to allow each of the volumes 64 to sequentially refill with water, and the valve to the carbonating gas source is open or kept open during this process to fill the head space within the volume 64 with carbon dioxide. The agitators 62 within each volume 64 are operated for a specific agitation interval or duration at a rate corresponding to the selected carbonation level. The rate of operation is adjusted for varying operating parameters, such as a change in temperature or pressure of the incoming liquid, or a high carbonation concentration of a previous batch above the carbonation level that was selected by the user. The controller 38 continues to monitor for a change in the carbonation level being selected by the user and performs the dispensing sequence at the selected carbonation level. At the end of the dispensing sequence, the controller 38 monitors for a carbonated water level selection input by a user. Upon receipt of an instruction, the operating processor repeats the steps previously described.

The invention being thus described, it will be obvious that the same may be varied in many ways. Such variations are not to be regarded as a departure from the spirit and scope of the invention and all such modifications are intended to be included within the scope of the following claims.

What is claimed is:

1. An apparatus for on-demand, selectable level carbonated water production comprising:

at least one carbonating unit having a volume with an inlet in communication with a source of carbonating gas and noncarbonated water and an outlet for discharging carbonated water;

an agitator housed within the volume of the carbonating unit;

a variable speed actuator operably connected to the agitator;

a controller operably connected to the variable speed actuator, the controller having a rate of operation for the agitator corresponding to a selected level of carbonation for an agitation interval; and wherein the controller adjusts the rate of operation for the agitator based, at least in part, on one or more user independent operating parameters;

whereby the apparatus further comprises a sequential discharge sequence within a single agitation interval having a first selected level of carbonation and a second selected level of carbonation, wherein the second selected level of carbonation is greater than the first.

2. The apparatus of claim 1 wherein the controller includes an operation comprising an increase in the rate of operation of the agitator to discharge a higher level of carbonation within the agitation interval.

3. The apparatus of claim 2 wherein the controller includes an operation comprising a decrease in the rate of operation of the agitator to discharge a lower level of carbonation within the agitation interval.

4. The apparatus of claim 1 further comprising a first rate of operation corresponding to a fixed agitation interval and a second rate of operation corresponding to the fixed agitation interval, the second rate of operation being greater than the first within the fixed agitation interval to increase the level of carbonation.

5. The apparatus of claim 1 wherein the rate of operation and the operation interval are codependently varied based on the selected level of carbonation.

6. The apparatus of claim 1 wherein the rate of operation is varied for each agitation interval for discharging carbonated water at different selected levels of carbonation.

7. The apparatus of claim 1 wherein the one or more user-independent operating parameters includes at least one of temperature or pressure associated with the source of carbonating gas, and temperature or pressure associated with the source of noncarbonating water.

8. A system for on-demand, selectable level carbonated water production comprising:

a first carbonating unit having a volume with an inlet in communication with a source of carbonating gas and noncarbonated water and an outlet for discharging carbonated water;

a second carbonating unit having a volume with an inlet in communication with a source of carbonating gas and noncarbonated water and an outlet for discharging carbonated water;

an agitator housed within the volume of the first and second carbonating unit;

a first variable speed actuator operably connected to the agitator in the first carbonating unit and a second variable speed actuator operably connected to the agitator in the second carbonating unit; and a controller operably connected to the first and second variable speed actuator;

wherein the controller adjusts the operating rate of the first carbonating unit and the second carbonating unit based, at least in part, on temperature or pressure associated with the sources of carbonating gas and noncarbonating water of the first carbonating unit and temperature or pressure associated with the sources of carbonating gas and noncarbonated water of the second carbonating unit.

9. The system of claim 8 wherein the controller includes a fixed agitation interval for each carbonating unit.

10. The system of claim 8 further comprising a data store having stored agitation intervals or agitation curves associated with selected levels of carbonation.

11. The system of claim 8 comprising a mode of operation wherein: a. the first actuator has a rate of operation corresponding to a first selected level of carbonation; and b. the second actuator has a rate of operation corresponding to a second selected level of carbonation.

* * * * *